INVENTORS
JAMES D. BRYAN
MERLE A. STARR
BY
ATTORNEY

Patented Feb. 27, 1951

2,543,434

UNITED STATES PATENT OFFICE 2,543,434

MARKER CIRCUIT

James D. Bryan, Cambridge, and Merle A. Starr, Belmont, Mass., assignors, by mesne assignments, to the United States of America as represented by the Secretary of War Application September 19, 1945, Serial No. 617,320

12 Claims. (Cl. 315—22)

This invention relates to electrical circuits and more particularly to indicator circuits of the cathode ray tube type.

While this invention is not limited to use with radio object-locating systems, the preferred embodiment of the invention has a very useful application in such systems. Only the preferred embodiment of the invention is described herein since this embodiment fully illustrates the principles of the invention and it should be kept in mind, therefore, that the various modifications and applications of this circuit that will become obvious as the description progresses form a part of this invention.

In certain types of radio object-locating devices a small area in space about a predetermined reference direction, the azimuth and elevation of which is usually specified by an auxiliary system, is searched or scanned by causing the main axis of the beam of electromagnetic energy transmitted by the system to move in a circle or a spiral about the fixed reference line. When a point on the axis of the beam describes a circle about the fixed reference line, the system is said to employ conical scanning; and when the point traces an in and out spiral, the system is said to employ spiral scanning.

One convenient method of presenting the information derived from the type of system described above is to employ a so-called B scope in which an illuminated spot is made to appear on a cathode ray tube so that the vertical distance from the spot to a horizontal reference line is proportional to the range to the target represented by the spot and the horizontal distance from the spot to a vertical reference line is proportional to the azimuth of the target with respect to some arbitrary reference line. In systems such as those described above the fixed vertical reference line used as an azimuth reference line on the B scope is usually the azimuth of the line about which the beam is scanning since the azimuth of this line is usually indicated by suitable devices associated with the sytem. In view of the above considerations it can be seen that it would be highly desirable to have some means of marking on the B scope a line corresponding in azimuth to the specified reference line about which the beam rotates. If this is done, the azimuth of any spot appearing on the B scope screen may be easily determined.

It is desirable in many applications to provide this reference line on the B-scope by intensifying the electron beam during one or more range sweeps. If a sharp distinct reference line is to be produced by the intensification of the range sweep, it is necessary to momentarily stop the azimuth sweep of the beam to prevent flickering or broadening of the line.

It is an object of the present invention, therefore, to provide a novel circuit for applying an azimuth sweep to a B scope and for electronically producing a line on the screen of the B scope which corresponds to a predetermined fixed reference line.

It is a further object of the present invention to provide means for momentarily stopping the sweep on a cathode ray tube while a reference line is produced on the cathode ray tube screen.

For a better understanding of the invention, together with other and further objects thereof, reference is had to the following description taken in connection with the accompanying drawings in which.

Figure 1:
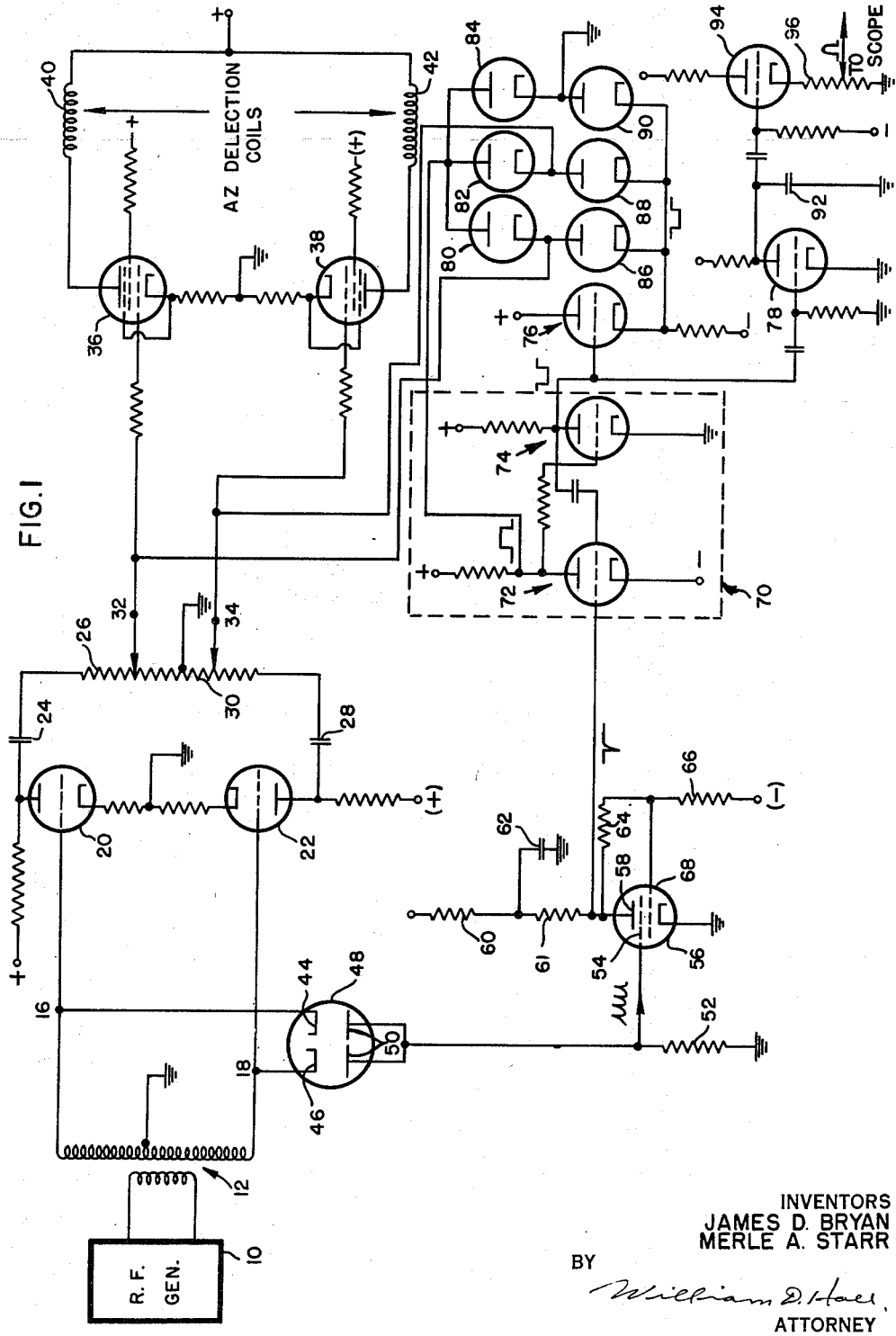
Fig. 1 is a schematic diagram of the invention.

Referring now to Fig. 1 for a more detailed description of the invention, there is shown a reference generator 10 connected to the primary of a transformer 12. Reference generator 10 is of the type normally employed in conical scan systems. Such generators normally produce two sinusoidal voltages in phase quadrature. In this embodiment of the invention it will be assumed that the voltage output of generator 10 is a sinusoidal voltage that passes through zero when the azimuth deviation of the electromagnetic beam with respect to a predetermined reference line is zero. Terminals 16 and 18 on the secondary of transformer 12 are connected to the control grids of vacuum tubes 20 and 22. The center tap of the secondary winding is connected to ground. Tubes 20 and 22 are connected in a push-pull amplifier circuit. The anodes of tubes 20 and 22 are connected to ground through coupling circuits comprising a capacitor 24 and a potentiometer 26 and a capacitor 28 and a potentiometer 30, respectively. Taps 32 and 34 on potentiometers 26 and 30, respectively, are connected to the control grids of two multi-electrode vacuum tubes 36 and 38, respectively. Tubes 36 and 38 are also connected in a push-pull amplifier circuit with the azimuth deflection coils 40 and 42 of a B scope (not shown) serving as the plate load impedances for tubes 36 and 38, respectively. The junction between coils 40 and 42 is returned to a suitable source of positive potential as shown in Fig. 1. The screen and suppressor grids in tubes 36 and 38 are connected in a conventional manner.

Terminals 16 and 18 of transformer 12 are also connected to cathodes 44 and 46, respectively, of a double diode vacuum tube 48. The anodes 50 of vacuum tube 48 are connected to ground through a resistor 52. Anodes 50 of tube 48 are also connected to a grid 54 of a multi-grid vacuum tube 56 which forms a part of a frequency dividing circuit. The anode 58 of tube 56 is connected to a source of positive potential through resistors 60 and 61, and the junction of these two resistors 60 and 61 is connected to ground through a capacitor 62. A voltage divider comprising resistors 64 and 66 is connected between anode 58 and a source of negative potential while the junction of resistors 64 and 66 is connected to a grid 68 of tube 56. The cathode of tube 56 is maintained at ground potential. Anode 58 of tube 56 is directly coupled to the control grid of a so-called one-shot, or flip-flop multivibrator 70. Multivibrator 70 consists of two vacuum tube amplifier stages 72 and 74 with the output of the first stage 72 coupled to the input of the second stage 74 through a resistor and the output of the second stage 74 coupled to the input of the first stage 72 through a capacitor. This type of circuit is well known in the art and examples of multivibrator circuits are illustrated and explained in various texts on electronics.

The output of the second stage 74 of multivibrator 70 is directly coupled to the input of a cathode follower 76 and through a resistor-capacitor coupling circuit to switch tube 78 and the output of the first stage 72 is connected to the anodes of three diode vacuum tubes 80, 82, and 84 which make up one half of a clamping circuit. Cathode follower 76 is conventional but it should be noted that the anode of the vacuum tube in this circuit is returned to a point of positive potential and the cathode is connected to a point of negative potential through the usual cathode resistor. The output of cathode follower 76 is connected to the cathodes of three diode vacuum tubes 86, 88, and 90, these tubes making up the other half of the clamping circuit mentioned above. The cathode of tube 84 and the anode of tube 90 are connected together and to ground; the cathode of tube 82 and the anode of tube 88 are connected together and to tap 34 on resistor 30, and the cathode of tube 80 and the anode of tube 86 are connected together and to tap 32 on resistor 26. The reason for these connections will be explained presently.

Switch tube 78 mentioned above is connected in a circuit that is similar to a conventional voltage amplifier stage except that capacitor 92 is connected between the anode of tube 78 and ground. The anode of tube 78 is connected through a conventional resistor-capacitor coupling circuit to the control grid of a voltage amplifier stage 94 that employs both an anode load resistor and a cathode load resistor 96. A movable tap on resistor 96 is connected to the intensity grid of a cathode ray tube (not shown). This cathode ray tube is the same tube with which azimuth deflection coils 40 and 42 are associated.

Figure 2:
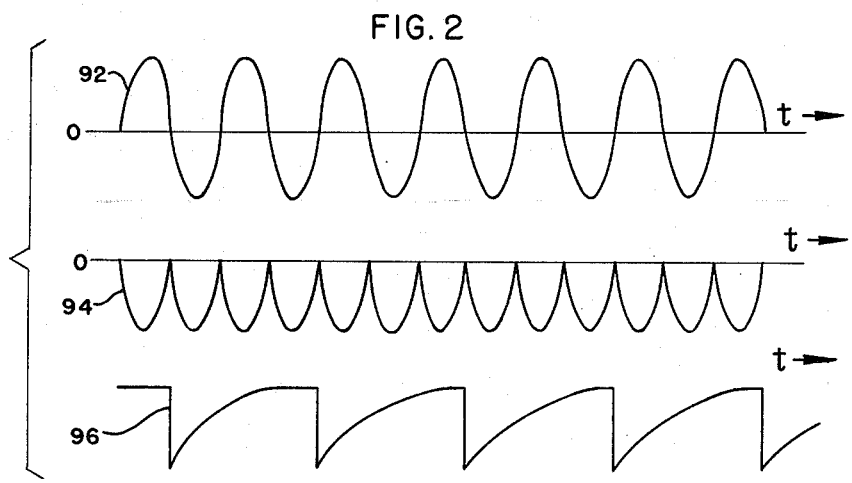
Fig. 2 is a set of waveforms that may be obtained from the circuit of Fig. 1.
Figure 3:
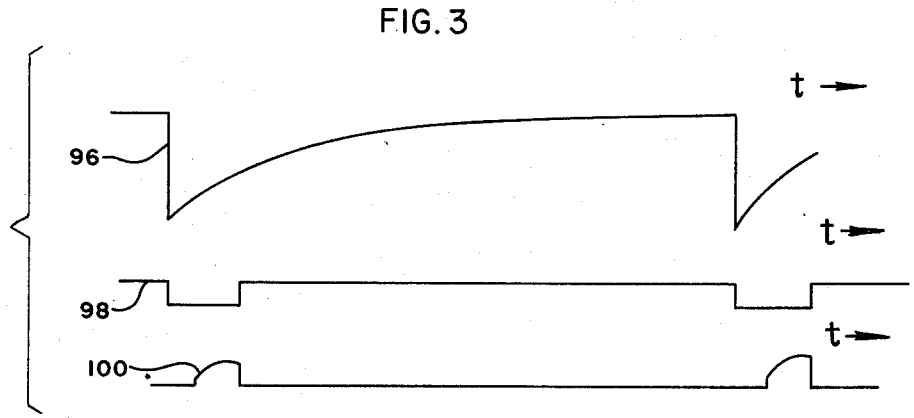
Fig. 3 is a second set of waveforms that may be obtained from the circuit of Fig. 1.

The operation of the circuit just described may be best understood by beginning at the reference generator 10 and following through first the operation of the sweep channel and secondly the operation of the clamping channel. Reference to Figs. 2 and 3 will aid in the understanding of the operation of this second channel.

The output of generator 10 as was stated above is a sinusoidal voltage that has its zero voltage points at the time that the electromagnetic beam of energy transmitted from the radio object locating system associated with this indicator passes through the zero azimuth position. This sinusoidal voltage is split by transformer 12 into two voltages 180 degrees out of phase. These two voltages are the control voltages that are applied to the push-pull amplifier stage including tubes 20 and 22. A portion of the output from this push-pull amplifier is obtained from resistors 26 and 30 by means of taps 32 and 34, respectively, and applied to a second push-pull amplifier stage containing tubes 36 and 38. The anode current which flows in coils 40 and 42 has a component that is a sinusoidal function of time which causes the electron beam of the cathode ray tube to sweep across the face of the tube in a sinusoidal manner. It can be seen that the position of the spot produced on the face of the cathode ray tube by this electron beam is always a true representation of the position in azimuth of the beam of radiated energy if it is remembered that the displacement of a point moving at a uniform velocity in a circle from a line passing through the center of the circle is a sinusoidal function of time.

The two sinusoidal voltages that are present at terminals 16 and 18 of transformer 12 are applied to the cathodes 44 and 46 of the full wave rectifier tube 48. One of these voltages is illustrated by waveform 92 of Fig. 2. Waveform 94, Fig. 2, is a plot of the potential on grid 54 as a function of time. It will be noted that this waveform has sharp voltage peaks that occur every time waveform 92 goes through zero. These sharp voltage peaks are used to trigger a relaxation oscillator of which tube 54 forms a part. Resistor 60, Fig. 1, has a much higher resistance than resistor 61. A positive-going pulse of grid 54 causes tube 56 to conduct which in turn causes capacitor 62 to discharge through the comparatively low impedance of tube 56 and resistor 61. This causes anode 58 to drop rapidly in potential. This drop in potential on anode 58 causes grid 68 to drop in potential which, together with the removal of the pulse from grid 54, causes plate current cutoff in tube 56. Capacitor 62 now charges through the comparatively high resistance of resistor 60 so that the next two pulses do not cause tube 56 to conduct. The voltage waveform at anode 58 will be similar to that shown in Fig. 2 as waveform 96. It can be seen that the circuit of tube 56 serves as a three-to-one frequency divider. It should be obvious to those skilled in the art that the invention is not limited to this type of frequency divider since other well known circuits, for example, a synchronized multivibrator will work as well.

The pulses at anode 58 trigger multivibrator circuit 70. In the normal state the first stage 72 of multivibrator 70 is conducting while the second stage 74 is cut off. When multivibrator 70 is triggered, a positive pulse is applied to the anodes of tubes 80, 82, and 84. The anodes of these tubes were considerably below ground before this pulse was applied, but they start to rise rapidly in potential toward the B+ potential of stage 72 as soon as stage 72 is triggered. This rise is stopped at approximately ground potential by conduction through tube 84. The cathodes of tubes 86, 88, and 90 were considerably above ground potential until multivibrator 70 was triggered, but now they start to drop in potential due to the negative pulse that is applied by cathode follower 76. This drop is limited to approximately ground potential by conduction through tube 90. It can now be seen that the potential at taps 32 and 34 will be approximately ground potential regardless of the signals supplied by tubes 20 and 22, for if tap 32 starts to rise above ground potential, tube 86 will conduct, and if it starts to fall below ground potential, tube 80 will conduct. In a similar manner the potential on tap 34 is clamped by tubes 80 and 88. Since taps 32 and 34 are at the same potential, the currents through coils 40 and 42 will be equal, and, therefore, the electron beam will be in the center of the cathode ray tube. It should be understood that the sweep is clamped in this position for only a relatively short time compared to the length of one complete sweep cycle so the potential across resistors 26 and 30 that is short circuited by the diode clamping tubes is never very large.

Figure 4:
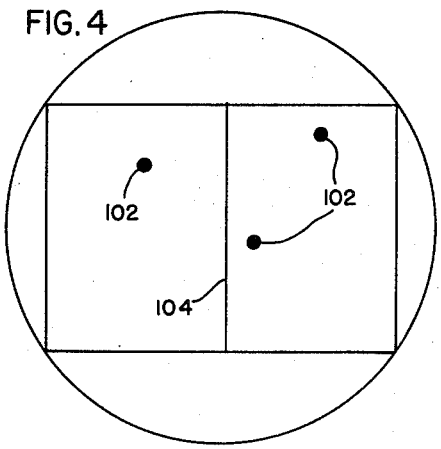
Fig. 4 is a view of the screen of a cathode ray tube that forms a part of the invention.

The negative pulse output from stage 74 of multivibrator 70 is applied to switch tube 78. The anode of tube 78 rises exponentially at a rate controlled by the load resistor of tube 78 and the size of capacitor 92. Tube 94 is normally cut off, but after the anode of tube 78 has risen sufficiently, this tube starts to conduct. Conduction will now continue in tube 94 until the end of the gate from multivibrator 70. The positive pulse on the cathode of tube 94 is used to intensify the sweep on the cathode ray tube while it is clamped in position. The amount of intensification is controlled by the position of the tap on resistor 96. The delay introduced by capacitor 92 allows sufficient time to damp out any transients that might have occurred in coils 40 and 42 due to the change from sinusoidal to steady currents through these coils. Since the range sweep is not clamped by the action of this circuit, a bright line will appear on the face of the B scope at a position corresponding in azimuth to the position of the transmitted beam as it passes through the zero azimuth position. Fig. 3 shows waveform 96 to an expanded scale and waveforms 98 and 100 are the potential at the grid of switch tube 78 and the cathode of tube 94, respectively. Fig. 4 is a view of the face of the B scope showing target echoes 102 and the reference line 104.

A slight stretching of the target echoes will occur in the vicinity of range line 104 due to the fact that the azimuth sweep is stopped momentarily while the antenna continues to rotate. This distortion is minimized by stopping the sweep every third time it goes through zero so that the targets will register in their proper position when the sweep is not stopped. Even if this refinement were not added, the distortion would be very slight and limited to a small region on either side of the range line.

The purpose and operation of this circuit may be summarized as follows. It is desirable to place an indication on the screen of a B scope that is indicative of the zero azimuth or reference position of a conically scanning antenna. This indication is preferably a sharp bright line at the zero azimuth position. This line is obtained by using the sine wave voltage from a reference generator that rotates in synchronism with the antenna for the azimuth sweep of the cathode ray tube of the B scope. The sine wave voltage is also rectified, and the sharp peaks of this rectified voltage are used to control a frequency divider circuit. A multivibrator circuit controlled by the above mentioned frequency divider circuit furnishes positive and negative gates to a clamping circuit that stops the sweep while an intensifying pulse is applied to the grid of the cathode ray tube. Since the intensifying pulse lasts for a period of time that is at least long enough for one complete range sweep, the line will not flicker even if the pulse repetition rate and scanning rate of the system are not synchronized.

The above description has been limited to conical scanning systems, but it will apply as well to systems employing spiral scan if the output of generator 10, Fig. 1, is modulated at the in and out frequency of the spiral scan. This same principle also may be applied to a type of indicator commonly called an E scope where a spot is made to appear on the face of a cathode ray tube at a point that is indicative of the elevation and range of a target.

The application of this circuit is not limited to use with radio object-locating systems since it may also be used as a null indicator for any repeating voltage as well as many other useful applications in the study and use of variable voltages.

While there has been described what is at present considered the preferred embodiment of the invention, it will be obvious to those skilled in the art that various changes and modifications may be made therein without departing from the invention.

What is claimed is:

1. In a cathode ray tube indicator for use with a radio object-locating system apparatus comprising generator means for producing a reference voltage, transformer means for dividing said reference voltage into two voltages in phase opposition, first and second push-pull amplifier means for successively amplifying said divided reference voltage, said second amplifier means employing first and second deflection coils of a cathode ray tube as an anode load, a full wave rectifier for rectifying a portion of the output of said transformer means, frequency dividing means synchronized by the output of said rectifier, multivibrator means for producing outputs in the form of a positive and a negative voltage gate pulse, means for initiating the operation of said multivibrator at times determined by said frequency dividing means, first, second, and third diode tubes, means for applying said positive gate pulse output from said multivibrator to the anodes of said first, second and third diode tubes, a cathode follower, means for applying the negative gate pulse output of said multivibrator to the input of said cathode follower, fourth, fifth, and sixth diode tubes, means for applying the output of said cathode follower to the cathodes of said fourth, fifth, and sixth diode tubes, means for connecting the cathode of said third diode tube to the anode of said sixth diode tube and to ground, means for connecting the cathodes of said first and second diode tubes to the anodes of said fourth and fifth diode tubes, respectively, means for connecting the cathodes of said first and second diode tubes to the inputs of said second push-pull amplifier whereby the potential of the inputs of said second push-pull amplifier is held at substantially ground potential when said multivibrator is operative, means for connecting the negative gate output pulse from said multivibrator to a delay means, a cathode follower amplifier means for amplifying the output of said delay means, and means for connecting the output of said cathode-follower amplifier to the intensity grid of the cathode ray tube associated with said deflection coils whereby the beam of said indicator is intensified during a fraction of the time said multivibrator is operative.

2. In a cathode ray tube indicator the apparatus comprising means producing a reference sine wave voltage, means for dividing said reference sine wave voltage into two voltages in phase opposition, means for amplifying said divided voltages, means for applying said amplified voltages to said cathode ray tube so that the electron beam of said tube is made to move in response to said voltages, means for producing a voltage pulse when said sine wave reference voltage passes through a zero voltage point, means for utilizing at least a portion of said pulses for controlling the operation of a gate generator means, said gate generator producing a positive and a negative voltage gate pulse, a plurality of diode clamping means responsive to said positive and negative gates from said gate generator, means connecting said clamping means to effectively short circuit the input of said amplifying means for a time interval determined by the length of the gate of said gate generator, delay means for delaying one of said gates from said gate generator, and means for applying said delayed gate to said cathode ray tube whereby the electron beam in said tube is intensified for a portion of the time that the input of said amplifying means is short circuited.

3. In an indicator having a cathode ray tube, the apparatus comprising means producing a reference alternating voltage having a given frequency, voltage translating means for applying said voltage to said cathode ray tube so that the electron beam of said tube is made to sweep periodically across the face thereof in response to said voltage, means coupled to said voltage producing means for generating a first series of periodic pulses having a repetition rate proportional to said given frequency and having a given phase relationship with respect to said voltage, means effective in short-circuiting the voltage across said translating means at a given point thereof in response to said first pulses, means for generating marker pulses in response to said first series of pulses, and means for applying said marker pulses to the control electrode of said cathode ray tube to intensify the electron beam thereof; whereby the sweep of said electron beam is momentarily stopped by the elimination of said voltage, and substantially simultaneously a marker line is produced, the location of said marker line being indicative of a predetermined angular value of said alternating voltage.

4. In a cathode ray tube indicator for use with a radio-object locating system comprising generator means for producing a reference voltage, transformer means for dividing said reference voltage into two voltages in phase opposition, first and second push-pull amplifier means for successively amplifying said divided reference voltage, said second amplifier means employing first and second deflection coils of a cathode ray tube as an anode load, a full wave rectifier for rectifying a portion of the output of said transformer means, frequency dividing means synchronized by the output of said rectifier, multivibrator means for producing outputs in the form of a positive and a negative voltage gate pulse, means for initiating the operation of said multivibrator at times determined by said frequency dividing means; first, second, and third diode tubes, means for applying said positive gate pulse output from said multivibrator to the anodes of said first, second, and third diode tubes; a cathode follower, means for applying the negative gate pulse output of said multivibrator to the input of said cathode follower; fourth, fifth, and sixth diode tubes, means for applying the output of said cathode follower to the cathode of said fourth, fifth, and sixth diode tubes; means for connecting the cathode of said third diode tube to the anode of said sixth diode tube and to ground, means for connecting the cathodes of said first and second diode tubes to the anodes of said fourth and fifth diode tubes, respectively, means for connecting the cathodes of said first and second diode tubes to the inputs of said second push-pull amplifier, whereby the potential of the inputs of said second push-pull amplifier is held at substantially ground potential and the deflection of said electron beam is stopped when said multivibrator is operative.

5. In a cathode ray tube indicator the apparatus comprising means producing a reference sine wave voltage, means for dividing said sine wave voltage into two voltages in phase opposition, means for amplifying said divided voltages, means for applying said amplified voltages to said cathode ray tube so that the electron beam of said tube is deflected in response to said voltages, means for producing a voltage pulse in response to and when said sine wave reference voltage passes through a zero voltage point, means for utilizing at least a portion of said pulses for controlling the operation of a gate generator means, said gate generator producting a positive and a negative voltage gate pulse, a plurality of diode clamping means responsive to said positive and negative gates from said gate generator, means connecting said clamping means to effectively short-circuit the inputs of said amplifying means for a time interval determined by the length of the respective gates of said gate generator, whereby the deflection of the electron beam of said cathode ray tube is momentarily stopped when the input of said amplifier is short-circuited.

6. In an indicator having a cathode ray tube, the apparatus comprising means producing a reference alternating voltage having a given frequency, voltage translating means for applying said voltage to said cathode ray tube so that the electron beam of said tube is made to sweep periodically across the face thereof in response to said voltage, means coupled to said voltage producing means for generating a series of periodic pulses having a repetition rate proportional to said given frequency and having a given phase relationship with respect to said voltage, and means effective in short-circuiting the voltage across said translating means at a given point thereof in response to said pulses, whereby the sweep of said electron beam is momentarily stopped by the elimination of said voltage.

7. In a cathode ray tube indicator having a deflection circuit including means producing a reference sine wave voltage, means for dividing said reference voltage into two voltages in phase opposition, means for amplifying said divided voltages, and means for applying said amplified voltages to said deflection circuit so that the electron beam of said tube is made to periodically sweep the face thereof in response to said voltages; the apparatus comprising a full wave rectifier for rectifying a portion of the input to said amplifying means, frequency dividing means synchronized by the output of said rectifier, multivibrator means for producing outputs in the form of a positive and a negative voltage gate pulse, means for initiating the operation of said multivibrator at times determined by said frequency dividing means, a plurality of diode clamping means responsive to said positive and negative gates from said multivibrator, means connecting said clamping means to effectively short-circuit the input to said amplifying means for a time interval determined by the length of the gates of said multivibrator, whereby the deflection of the electron beam of said cathode ray tube is momentarily stopped when the input of said amplifier means is short-circuited.

8. An apparatus according to claim 7 further comprising delay means for delaying one of said gates from said multivibrator, and means for applying said delayed gate to said cathode ray tube whereby the electron beam in said tube is intensified for a portion of the time that the input to the amplifying means is short-circuited.

9. In a cathode ray tube indicator having a deflection circuit including means producing a reference alternating voltage having a given frequency, and voltage translating means for applying said voltage to said deflection circuit so that the electron beam of said tube is made to periodically sweep across the face thereof in response to said voltage; the apparatus comprising means coupled to said voltage producing means for generating a series of periodic pulses having a repetition rate in proportion to said given frequency and having a given phase relationship with respect to said voltage, and means effective in short-circuiting the voltage across said translating means in response to said pulses, whereby the sweep of said electron beam is momentarily stopped by the elimination of the voltage across said translating means.

10. An apparatus according to claim 9 further comprising means for generating marker pulses in response to said pulses, and means for applying said marker pulses to said cathode ray tube to intensify the electron beam thereof, whereby a marker line is produced substantially simultaneously with the short-circuiting of the voltage across said translating means, the location of said marker being indicative of a predetermined angular value of said alternating voltage.

11. In an indicator having a cathode ray tube, an apparatus comprising a source of reference alternating voltage, translating means for applying said alternating voltage to a deflection circuit of said cathode ray tube, means synchronized by said alternating voltage for periodically, at a predetermined angular value of said alternating voltage, short circuiting the voltage across said translating means at a given point thereof, wherein said translating means includes a plurality of channels, and wherein said short-circuiting means includes means for short-circuiting the potential across each of said channels to a point of reference potential, whereby the voltage across said deflection circuit is eliminated and the deflection of the electron beam of said cathode ray tube is periodically momentarily stopped.

12. An apparatus according to claim 11 further comprising means coupled to said short-circuiting means for generating marker pulses during the intervals the voltage across said deflection circuit is eliminated, and means for applying said marker pulses to said cathode ray tube to intensify the electron beam thereof.

JAMES D. BRYAN.
MERLE A. STARR.

REFERENCES CITED

The following references are of record in the file of this patent:

UNITED STATES PATENTS

| Number | Name | Date |
|---|---|---|
| 2,121,359 | Luck et al. | June 21, 1938 |
| 2,280,531 | Norgaard | Apr. 21, 1942 |
| 2,439,321 | Starr | Apr. 6, 1948 |